United States Patent [19]

Levin

[11] Patent Number: 4,737,348
[45] Date of Patent: Apr. 12, 1988

[54] APPARATUS FOR MAKING MOLTEN SILICON

[76] Inventor: Harry Levin, 19831 Friar St., Woodland Hills, Calif. 91367

[21] Appl. No.: 618,712

[22] Filed: Jun. 8, 1984

Related U.S. Application Data

[62] Division of Ser. No. 390,920, Jun. 22, 1982, abandoned.

[51] Int. Cl.$^4$ .............................................. C01B 33/02
[52] U.S. Cl. .................................... 422/199; 422/202; 422/241; 423/350
[58] Field of Search ............... 422/199, 202, 240, 241; 165/136, 48 R, 61; 423/349, 350

[56] References Cited

U.S. PATENT DOCUMENTS

| | | | |
|---|---|---|---|
| 4,265,859 | 5/1981 | Jewett | 423/350 |
| 4,272,488 | 6/1981 | Carman | 422/199 |
| 4,341,749 | 7/1982 | Iya et al. | 423/349 |
| 4,342,284 | 8/1982 | Löser et al. | 118/716 |
| 4,343,772 | 8/1982 | Levin et al. | 422/200 |
| 4,377,564 | 3/1983 | Dahlberg | 423/349 |

FOREIGN PATENT DOCUMENTS 1128412 4/1962 Fed. Rep. of Germany ...... 423/349

OTHER PUBLICATIONS

Novel Duplex Vapor-Electrochemical Method for Silicon Solar Cells, FRDA/JPL 954471-77/3 Quarterly Report, No. 11, (Oct. 31, 1978).
Novel Duplex Vapor-Electrochemical Method for Silicon Solar Cells, DOE/JPL 954471-79/12 Quarterly Report, No. 15, (Nov. 30, 1979).
H. Levin, Silicon Formation by Pyrolysis of Silane, Low-Cost Solar Array Project 5101-87, Oct. 1978.
O'Donnel et al., Compatability Studies of Various Refractory Materials in Contact with Molten Silicon), Jet Propulsion Lab, (JBL Publication 78-18), Mar. 1978).

*Primary Examiner*—David L. Lacey
*Attorney, Agent, or Firm*—Donald L. Johnson; John F. Sieberth; Robert A. Linn

[57] ABSTRACT

A reactor apparatus (10) adapted for continuously producing molten, solar grade purity elemental silicon by thermal reaction of a suitable precursor gas, such as silane ($SiH_4$), is disclosed. The reactor apparatus (10) includes an elongated reactor body (32) having graphite or carbon walls which are heated to a temperature exceeding the melting temperature of silicon. The precursor gas enters the reactor body (32) through an efficiently cooled inlet tube assembly (22) and a relatively thin carbon or graphite septum (44). The septum (44), being in contact on one side with the cooled inlet (22) and the heated interior of the reactor (32) on the other side, provides a sharp temperature gradient for the precursor gas entering the reactor (32) and renders the operation of the inlet tube assembly (22) substantially free of clogging. The precursor gas flows in the reactor (32) in a substantially smooth, substantially axial manner. Liquid silicon formed in the initial stages of the thermal reaction reacts with the graphite or carbon walls to provide a silicon carbide coating on the walls. The silicon carbide coated reactor is highly adapted for prolonged use for production of highly pure solar grade silicon. Liquid silicon (20) produced in the reactor apparatus (10) may be used directly in a Czochralski or other crystal shaping equipment.

15 Claims, 2 Drawing Sheets

APPARATUS FOR MAKING MOLTEN SILICON

ORIGIN OF THE INVENTION

The invention described herein was made in the performance of work under NASA Contract No. NAS7-100 and is subject to the provisions of Section 305 of the National Aeronautics and Space Act of 1958 (72 Stat. 435; 42 U.S.C. 2457).

This application is a division of application Ser. No. 390,920, filed June 22, 1982, now abandoned.

BACKGROUND OF THE INVENTION

1. Field of the Invention

The present invention is directed to a process and apparatus for making solar and semiconductor grade silicon by thermal reaction of a suitable precursor gas composition. More particularly, the present invention is directed to a process and apparatus for continuous production of solar and semiconductor grade silicon in the liquid phase, by thermal decomposition of a suitable precursor gas, such as silane.

2. Brief Description of the Prior Art

As is well known, highly pure elemental silicon properly doped with minute quantities of suitable doping agents, is the most widely used semiconductor and solar cell material. In view of the recent trend of increasing reliance on solar energy, there exists a significant demand for solar cell grade silicon at a reasonable cost. In fact, the present unavailability of solar cell grade silicon at a reasonable cost represents the principal factor which presently still renders solar cells too expensive for large-scale electrical power generation.

Solar cell or semiconductor grade (hereinafter solar grade) silicon is usually manufactured in a two-step chemical process. First, solid silicon compounds abundantly available from the Earth's crust (such as $SiO_2$) are converted into gaseous or low boiling liquid silicon compounds such as silicon tetrachloride ($SiCl_4$), trichlorosilane ($SiHCl_3$) and silane ($SiH_4$). The gaseous or liquid silicon compounds are then relatively readily purified by fractional distillation or like processes.

In the next step of preparing elemental silicon of solar grade purity, the purified silicon compound is reacted in gaseous phase to yield elemental silicon, and usually a gaseous by-product. For example, silane gas is thermally decomposed in accordance with Equation I to yield silicon and hydrogen gas.

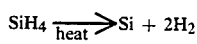

Equation I

The above-summarized processes have, hitherto, been performed in the prior art to yield solid elemental silicon. Often, the processes yield very low overall-density agglomerated particles of silicon which are hard to handle in an efficient and continuous manner. Other examples of problems associated with the gas-to-solid thermal reaction processes are: undesirable deposition of a hard silicon crust on the reactor walls, and frequent interruption of the process due to the above-noted and other problems. For example, in accordance with the most widely used prior art "Moisson" process for chemical preparation of solar grade silicon, elemental silicon is grown epitaxially on the surface of rods disposed in a reactor wherein trichlorosilane ($SiHCl_3$) and hydrogen ($H_2$) gases are reacted. However, even this process must be interupted from time to time in order to remove the solid silicon deposited on the rods, and to clean the reactor.

Another significant disadvantage of the prior art chemical processes for the preparation of solid silicon is that the resulting product is usually not sufficiently large grain crystalline to be directly suitable for semiconductor or solar cell applications. Therefore, the solid silicon produced by the prior art processes must be melted in a separate step and converted in a Czochralski or like crystal pulling apparatus into large grain crystalline (ideally monocrystalline) ingots, ribbons and the like. Thus, as is well appreciated by those skilled in the art, the overall prior art processes for preparing silicon solar cells require an undesirably high input of energy.

In order to overcome or alleviate the above-noted problems, a few attempts were made in the prior art to obtain molten, rather than solid, silicon in the thermal reaction process. For example, Japanese patent application laid open for public inspection on Dec. 2, 1977, Ser. No. 52-144959, describes a process wherein a bath of molten silicon (obtained from previously-prepared solid silicon of high purity) is maintained in a reaction vessel wherein trichlorosilane ($SiHCl_3$) or silicon tetrachloride ($SiCl_4$) and hydrogen gas ($H_2$) are reacted. The silicon tetrachloride ($SiCl_4$) or trichlorosilane ($SiHCl_3$) is heated to 300°–500° C., and the hydrogen gas ($H_2$) is heated to 1200°–1600° C. prior to introduction into the reaction vessel. The temperature is maintained in the gas containing part of the reaction vessel between 1050° to 1150° C. so that solid elemental silicon is formed in the vessel by the reaction of the gases. The solid silicon, however, falls into the bath of molten silicon where it melts. A readily apparent disadvantage of the just-described process is that it is not suitable for production of silicon from silane ($SiH_4$), because silane would already start significant thermal decomposition while being preheated prior to introduction into the reaction vessel. Furthermore, the reactants used in the process provide elemental silicon only in a relatively low yield. Still further, the process is batchwise, rather than continuous, in the sense that the gaseous reactants must be allowed to dwell in the reactor for a relatively long time to reach equilibrium. Perhaps for these and other reasons, according to the best knowledge of the present inventor, this prior art process has not gained even moderate industrial acceptance.

U.S. patent application Ser. No. 126,063 filed on Feb. 29, 1980, now U.S. Pat. No. 4,343,772, represents an attempt for production of molten silicon in a continuously operating reactor by thermal reaction of a suitable silicon containing precursor gas. In accordance with this disclosure, a precursor gas, such as silane, flows in an outer, forwardly moving vortex in a spiral flow reactor. A by-product gas, such as hydrogen, moves in an inner, rearwardly moving vortex. The walls of the reactor are maintained at a temperature above the melting point of silicon. Molten silicon flows downwardly on the walls of the reactor to collect in a pool wherefrom it is removed. A cooled injector probe having an internal diameter of about 0.06 inches is utilized to introduce the precursor gas tangentially relative to the interior cylindrical surface of the reactor. A vortex finder tube is disposed substantially in the center on the top of the reactor to remove the rearwardly moving vortex of the by-product gas.

The reactor described in the above-noted patent application, although designed to operate continuously for the production of molten silicon, is far from free of problems. More specifically, the injector tube is subject to frequent clogging due to formation of a solid silicon plug therein, and the emitted by-product gas contains a relatively large quantity of finely dispersed solid silicon particles.

Additional disclosures relating to the preparation of solar grade silicon are found in the following printed publications: Low-Cost Solar Array Project 5101-87, "Silicon Formation by Pyrolysis of Silane," Interim Report of the Continuous Flow Pyrolyzer Study, by H. Levin, Jet Propulsion Laboratory, California Institute of Technology, October 1978, and "Compatibility Studies of Various Refractory Materials in Contact with Molten Silicon," by O'Donnel et al., Jet Propulsion Laboratory, California Institute of Technology, March 1978 (JPL Publication 78-18).

In light of the foregoing, there still is a serious want in the prior art for a continuously operable efficient process and apparatus for chemically preparing molten silicon from a gaseous starting material. The present invention provides such a process and apparatus.

SUMMARY OF THE INVENTION

It is an object of the present invention to provide an apparatus and process for the efficient continuous production of molten silicon from a suitable silicon containing precursor gas.

It is another object of the present invention to provide an apparatus for the continuous production of molten silicon which readily withstands prolonged exposure to molten silicon.

These and other objects and advantages are attained by a reactor apparatus wherein substantially smooth flow of a suitable silicon containing precursor gas is maintained in a substantially axial direction in an elongated reactor heated to a temperature above the melting temperature of elemental silicon. Thermal reaction of the precursor gas directly yields molten silicon which flows down on the walls of the reactor to be removed from a bottom thereof in the liquid state.

In accordance with one aspect of the present invention, an inlet tube of the reactor which injects the precursor gas into the reactor is efficiently cooled to prevent thermal formation of silicon prior to entry of the precursor gas into the reactor. One side of a relatively thin septum attached to the inlet tube is substantially in the same temperature range as the inlet tube, while the other side of the septum is exposed to the interior of the reactor and is substantially in the same temperature range as the reactor. As a result, the precursor gas entering the reactor is subjected to a very quick transition in temperature with substantially total avoidance of clogging the inlet tube by formation of a solid silicon plug.

In accordance with another aspect of the present invention, the walls of the reactor are made of graphite or carbon material which have been discovered to be quickly coated during the initial exposure of the reactor to liquid silicon with a highly resistant silicon carbide layer.

The features of the present invention can be best understood, together with further objects and advantages, by reference to the following description, taken in connection with the drawings, wherein like numerals indicate like parts.

BRIEF DESCRIPTION OF THE DRAWINGS

FIG. 3 is a schematic perspective view showing a precursor gas inlet tube assembly incorporated in the reactor apparatus of the present invention.

DESCRIPTION OF THE PREFERRED EMBODIMENT

The following specification taken in conjunction with the drawings sets forth the preferred embodiment of the present invention in such a manner that any person skilled in the chemical arts can use the invention. The embodiment of the invention disclosed herein is the best mode contemplated by the inventor for carrying out his invention in a commercial environment, although it should be understood that various modifications can be accomplished within the parameters of the present invention.

Figure 1:
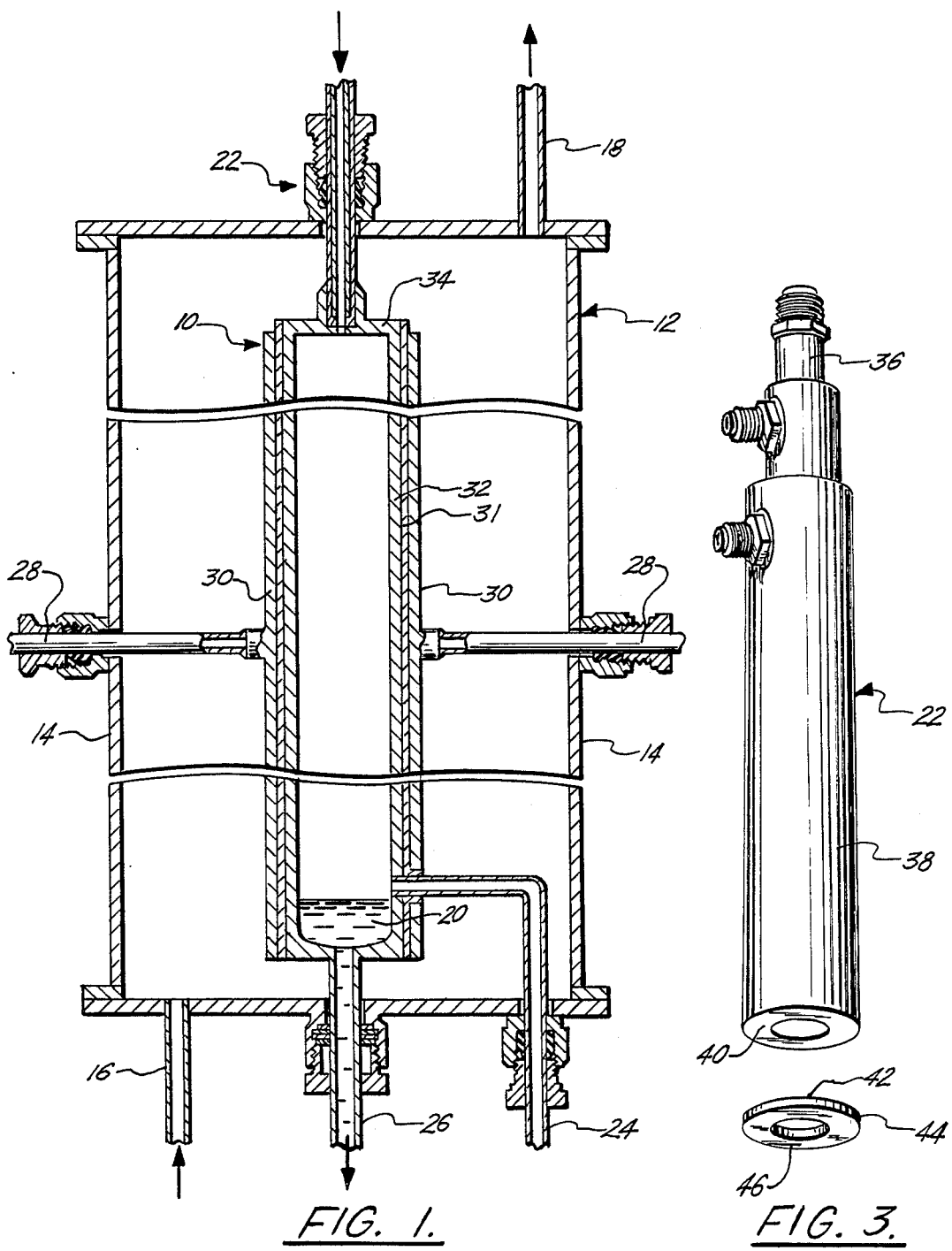
FIG. 1 is a schematic cross-sectional view showing the reactor apparatus of the present invention enclosed in an outer cylinder.
Figure 2:
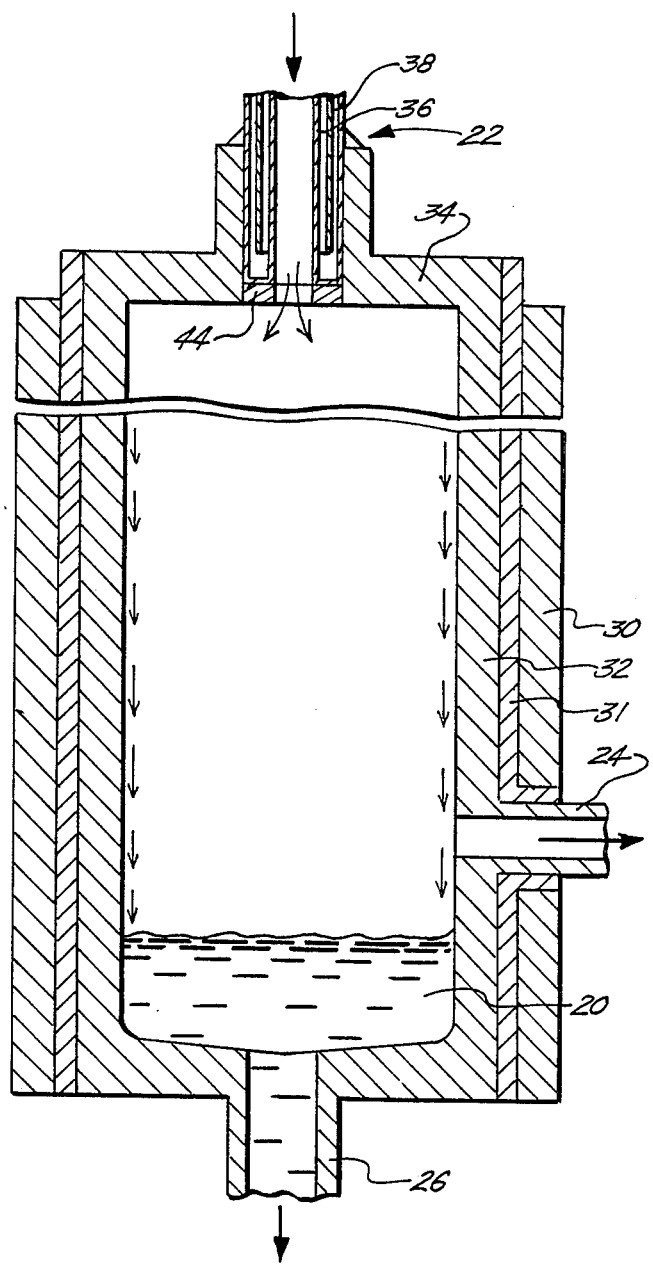
FIG. 2 is a schematic cross-sectional view showing the reactor apparatus of the present invention.

Referring now to the drawing Figures and particularly to the schematic cross-sectional views of FIGS. 1 and 2, the reactor apparatus 10 of the present invention is disclosed. The reactor apparatus 10 of the present invention is adapted for producing high purity molten silicon in a continuous process by thermal reaction of a suitable silicon containing precursor gas composition. Several known chemical reactions may be utilized in the novel process practiced in the reactor apparatus 10. For example, silicon may be produced in the apparatus 10 by reduction of tetrachlorosilane (SiCl$_4$) or trichlorosilane (SiHCl$_3$) with hydrogen (H$_2$) in accordance with Equations II and III respectively.

$$SiCl_4 + 2H_2 \rightarrow Si + 4HCl \qquad \text{II}$$

$$SiHCl_3 + H_2 \rightarrow Si + 3HCl \qquad \text{III}$$

However, the apparatus 10 and process of the present invention is designed most advantageously for continuous production of silicon by thermal decomposition of silane gas into silicon and hydrogen gas in accordance with Equation I (set forth in the introductory section of the present application for patent). Therefore, the following exemplary description principally describes the utilization of the thermal decomposition reaction of silane in the novel apparatus and process of the present invention. Furthermore, hereinafter the term "precursor gas" is interchangeably used with the term "silane," and the term "by-product gas" is interchangeably used with the term "hydrogen." Nevertheless, it should be kept in mind that in the event the process of the present invention utilizes alternative chemical reactions (such as the reactions of Equations II or III), the precursor gas may be other than silane, and the by-product gas or gases may be other than hydrogen.

Referring now principally to FIG. 1, the reactor apparatus 10 of the present invention is shown mounted in a suitable outer cylinder 12. The principal purpose of the outer cylinder 12 is to contain the reactor apparatus 10 in an inert gas atmosphere while the reactor apparatus 10 is heated to high temperatures. The outer cylinder 12 may be constructed substantially in accordance with the state-of-the-art. The outer cylinder 12, of course, also provides thermal insulation for the reactor apparatus 10, and for that purpose walls 14 made of stainless steel encasing suitable insulating materials (not shown) which surround the reactor apparatus 10. Inlet and outlet tubes for the inert gas, which is preferably argon, are schematically shown on FIG. 1 and bear the reference numerals 16 and 18, respectively.

The protective outer cylinder 12 also has suitable inlet ports for ducts carrying the precursor gas, the by-product gas, and the reaction product, molten silicon 20. On the schematic view of FIG. 1, the inlet duct assembly for the precursor gas silane bears the reference numeral 22, the outlet duct for the by-product hydrogen the reference numeral 24, and the outlet duct for molten silicon the reference numeral 26. Finally, the outer cylinder 12 is provided with suitable entry ports for copper or like conduits 28 which conduct current for energizing graphite, "picket fence" type resistance heaters 30 surrounding the inner reactor apparatus 10. The resistance heaters 30 and the inner reactor apparatus 32 are separated from one another by a high temperature resistant electrical insulator 31.

Referring now principally to the schematic cross-sectional view of FIG. 2, the inner reactor apparatus 10 is disclosed in detail. The reactor apparatus is an elongated hollow body; preferably, as is shown in the herein-described preferred embodiment, it is a hollow cylindrical body the length of which greatly exceeds its diameter. In a specific example of the reactor apparatus 10 of the present invention the cylindrical reactor body or reactor 32 is 157 cm long, and has an inner diameter of 7.6 cm. The relative length-to-width ratio of the reactor 32 is designed to provide a sufficiently long dwelling time for the gaseous reactants in the reactor 32 to reach thermodynamic equilibrium, which, under the conditions prevailing in the reactor 32, favors high yields of elemental silicon. In fact, in the apparatus of the present invention silane gas is converted in substantially one hundred percent (100%) yield to silicon.

In accordance with one important aspect of the invention, the reactor 32 is made of highly pure graphite or carbon material which rapidly reacts under the conditions prevailing in the reactor 32 with silicon to form silicon carbide (SiC). In fact, it was found in experience that the silicon formed in the initial stages of the operation of the reactor apparatus 10 is substantially consumed to react with the inner walls of the reactor 32. The resulting silicon carbide coating on the reactor walls is highly wettable by molten silicon, and is yet highly resistant to molten silicon. This is a very advantageous feature of the reactor apparatus 10 of the present invention, because it permits the formation of highly pure solar grade silicon substantially uncontaminated by material dissolved from the reactor walls.

For comparison, it is noted that liquid silicon is known in the art to be highly reactive and is often termed a "univeral solvent." In fact, most prior art silicon crystal pulling apparatus struggle with the problem of keeping molten silicon sufficiently free of impurities formed when the liquid silicon reacts with or dissolves the walls of a crucible, capillary die, or the like. The present invention, however, completely solves this problem by providing the readily available graphite or carbon reactor material, which during the process of the invention "self-converts" into the highly durable and liquid-silicon resistant silicon carbide. The initial stage of converting the carbon walls of the reactor 32 into silicon carbide is termed "priming" of the reactor.

Heating of the reactor body 32 is accomplished by the "picket fence" type resistant heaters 30 which surround the reactor body 32. In alternative embodiments of the reactor apparatus 10 of the present invention, other methods of heating may be utilized. The only critical feature of the invention regarding heating is that the interior of the reactor 32 and the interior walls are maintained above the melting temperature of silicon (1412° C.) during the process of silicon production. Preferably, the interior of the reactor 32 is maintained above 1500° C., and most preferably it is maintained approximately between 1600° to 1800° C. At the operating temperatures of the reactor apparatus 10 (i.e., above 1412° C.), the thermal decomposition of silane gas into silicon and hydrogen is relatively rapid. Furthermore, at this temperature the thermodynamic equilibrium favors formation of elemental silicon with substantially one hundred percent (100%) yield.

Actually, the above-noted upper limit of approximately 1800° C. is not a limit of the process of the present invention, because the process may be practiced at still higher temperatures. Rather, approximately 1800° C. is the upper limit of temperature that the materials of the reactor apparatus 10 of the present invention can withstand without damage.

With regard to the above-noted temperature ranges of the process of the present invention, it is further noted that conversion of the carbon or graphite walls of the reactor 32 to silicon carbide occurs below 1300° C. too slowly to have any practical effect on priming the reactor 32. Therefore, in the prior art reactors operating at temperatures below 1300° C. the very advantageous "priming" of the reactor does not occur to a significant extent.

Experience proved the reactor apparatus 10 of the present invention to be capable of withstanding repeated temperature cycling between ambient temperature (nonoperational time of the reactor) and 1400°–1800° C. (operation).

The silicon formed in the reactor 32 is in the molten phase, and flows down the silicon carbide interior walls of the reactor 32 to collect in the bottom thereof. Pure, solar grade molten silicon is drained from the bottom of the reactor 32 and is advantageously utilized, without being allowed to solidify, in a Czochralski or other crystal shaping equipment (not shown) to provide silicon ingots or ribbons (not shown).

Preferably, the reactor apparatus 10 is disposed in a substantially upright position, as is shown on FIGS. 1 and 2, so that flow of the molten silicon 20 on the reactor walls is gravity induced.

Figure 4:
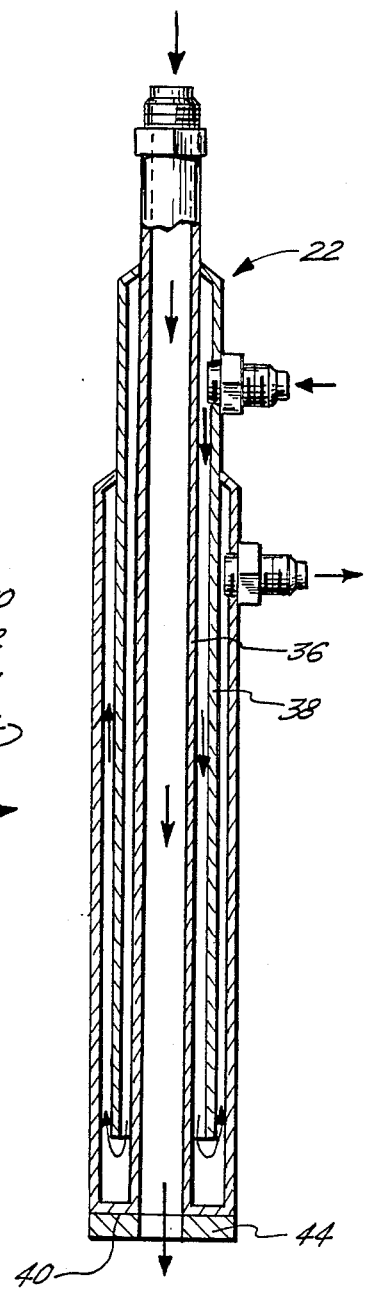
FIG. 4 is a cross-sectional view showing the precursor gas inlet tube assembly incorporated in the reactor apparatus of the present invention.

Referring now principally to FIGS. 3 and 4, the silane gas inlet duct or tube assembly 22 is disclosed in detail. The inlet tube assembly 22 is particularly adapted and highly suited for supplying silane gas into the reactor 32 in a continuous and substantially nonclogging manner. As is shown on FIG. 2, the inlet tube assembly 22 is disposed substantially in the center of a top wall 34 of the reactor 32 in such a manner that the inlet tube assembly 22 is located outside of the heated interior space of the reactor 32.

The inlet tube assembly 22 comprises an elongated inlet tube 36 which is connected to a supply of silane gas. The inlet tube 36 is surrounded by a jacket 38 wherethrough a cooling medium, such as water, is circulated. The end of the inlet tube 36 and the end of the jacket 38 together form a substantially flat substantially ring-shaped surface 40.

The ring-shaped surface 40 of the inlet tube assembly 22 is not directly exposed to the interior of the reactor 32. Rather, it is in contact with one side 42 of a carbon or graphite septum 44. The septum 44 comprises a relatively thin ring-shaped body which substantially conforms to the shape of the end of the inlet tube assembly 22. A second side 46 of the septum 44 is substantially flush with the interior surface of the top wall 34 of the reactor 32, as is shown on FIG. 2.

The septum 44 insulates the inlet tube 36 from the high temperature of the reactor 32 and causes the silane gas which enters the reactor 32 to experience a very sharp temperature gradient. This is because one side 42 of the septum 44 is in contact with the efficiently cooled surface 40 of the inlet tube 36 and jacket 38, and is substantially in the same temperature range as the inlet tube 36. The other side 46 of the septum 44 is exposed to the heated interior of the reaction 32, and, being of a dark high emissivity material (porous carbon), is substantially in the same temperature range as the interior of the reactor 32.

During the process of the present invention, silane gas is continuously fed through the inlet tube assembly 22 into the reactor 32. The inlet tube assembly 22 is vigorously cooled by water circulated through the cooling jacket 38. In accordance with one important aspect of the present invention, the temperature of the silane gas introduced into the reactor 32 through the inlet tube 36 is kept at a temperature below 350° C. This is for the purpose of avoiding any significant thermal decomposition of the silane gas, prematurely, before entry of the silane gas into the reactor 32. In order to facilitate efficient cooling of the inlet tube assembly 22, the inlet tube 36 and the jacket 38 are made of a material of high thermal conductivity, such as copper.

The relatively thin septum 44 of carbon or graphite is highly effective to avoid thermal precipitation of fine solid silicon particles on the inlet tube surfaces and ensuing clogging of the inlet tube and the narrow septum 44 itself. Experience has shown that during the "priming" stage of the operation of the reactor apparatus 10, the septum 44 too reacts with the newly-formed liquid silicon to form silicon carbide.

The inlet tube assembly 22 of the reactor apparatus of the present invention operates without clogging. In contrast with the prior art inlet assembly disclosed in the above-noted U.S. patent application Ser. No. 126,063, now U.S. Pat. No. 4,343,772 the internal diameter of the inlet tube 36 may be quite substantial. In the herein-described specific example wherein the length of the reactor is 157 cm, the internal diameter of the inlet tube 36 is approximately 1 cm, and the diameter of the septum 44 is approximately 2.2 cm.

Dwelling time of the silane gas in the heated reactor 32 is selected in such a manner that the silane-to-liquid silicon reaction proceeds to substantially reach thermodynamic equilibrium which favors complete decomposition. During the process, the silane gas and the by-product hydrogen gas flow in a substantially smooth, substantially unperturbed flow substantially axially in the reactor 32. The lower, reservoir portion of the reactor 32, containing molten silicon 20, is kept at a temperature exceeding the melting temperature of silicon. The molten silicon may be continuously drained out of the reactor apparatus 10 through the outlet duct 26 which may be constructed in accordance with state of the art. The by-product hydrogen gas leaves the reactor 32 through the hydrogen outlet duct 24 which is located on a side wall of the reactor 32 above the level of molten silicon 20.

Principal advantages of the above-described reactor apparatus and process of the present invention include the following. The reactor 32 is readily manufactured of relatively inexpensive pure carbon or graphite material, and yet readily "primes" or converts itself to eventually expose only non-contaminating silicon carbide for contact with the highly pure, solar grade silicon. The reactor is capable of continuous, trouble-free operation, is not subject to clogging due to buildup of solid silicon material, and does not require continuous scraping or clearing operation to keep the walls free of deposited hard crust of silicon.

The above-described specific embodiment of the reactor apparatus 10 is capable of producing several kilograms (up to 15 Kg) of solar grade molten silicon per hour. For a still larger scale silicon producing plant a still larger embodiment of the reactor apparatus 10 of the present invention may be utilized. Alternatively, and preferably several reactors of approximately of the above-noted specific dimensions may be operated simultaneously.

Furthermore, the molten silicon chemically obtained in the process of the present invention may be directly fed into a Czochralski or other crystal shaping apparatus (not shown), eliminating the need for remelting of solid silicon.

Several modifications of the above-described apparatus and process may become readily apparent to those skilled in the art in light of the above disclosure. Therefore, the scope of the present invention should be interpreted solely from the following claims.

What is claimed is:

1. A reactor apparatus for the production of molten silicon from a gas composition comprising a silicon-containing precursor gas, said apparatus comprising:

a reactor having walls defining a reaction chamber for the substantially smooth axial flow of said gas composition;

means for heating said reaction chamber above the melting point of silicon;

inlet means located outside said reaction chamber such that the surface of said inlet means is not directly exposed to said reaction chamber, said inlet means fluidly communicating with said reactor for supplying a gas composition comprising a silicon-containing precursor gas to said reaction chamber, said inlet means including a jacket for receiving a circulating cooling medium for maintaining said gas composition below the decomposition temperature of said silicon-containing precursor gas;

insulating septum means having one face and an opposite face, said septum means being disposed between said inlet means and said reaction chamber with said one face adjacent the reaction chamber and said opposite face adjacent said inlet means for passing the gas composition from said inlet means at a temperature below the decomposition temperature of said silicon-containing precursor gas to said reaction chamber at a temperature at or above the melting point of silicon, said septum means being capable of maintaining said one face adjacent the reaction chamber at or above the melting point of silicon and said opposite face adjacent said inlet means below the decomposition temperature of said silicon-containing precursor gas;

outlet means positioned opposite said inlet means for receiving and removing by-product gas from said reaction chamber; and means at the bottom of the reaction chamber for collecting molten silicon.

2. The reactor apparatus of claim 1 wherein the heating means further comprises means for maintaining the internal temperature approximately between 1500°–1800° C.

3. The reactor apparatus of claim 2 wherein the heating means further comprises means for maintaining the internal temperature approximately between 1600°–1800° C.

4. The reactor apparatus of claim 1 wherein the walls of the reactor comprise carbon or graphite material capable of reacting with molten silicon to form silicon carbide and to provide at least a coating of silicon carbide on said walls.

5. The reactor apparatus of claim 1 wherein the reactor comprises a cylinder.

6. The reactor apparatus of claim 1 wherein the reactor comprises a substantially upright-standing elongated hollow body, and wherein said gas inlet means is positioned above said elongated hollow body and in fluid communication therewith to provide a substantially axial flow of gas therein.

7. The reactor apparatus of claim 6 wherein said molten silicon collection means is positioned below said gas inlet means to permit gravity-induced outflow of molten silicon substantially from the bottom of said elongated body.

8. The reactor apparatus of claim 7 wherein the reactor comprises an elongated cylindrical hollow body.

9. The reactor apparatus of claim 1 wherein the septum means comprises an annular body of carbon or graphite.

10. The reactor apparatus of claim 1 wherein the inlet means comprises a copper tube.

11. A reactor apparatus for the production of molten silicon by thermal decomposition of silane, said apparatus comprising:

(a) a reactor body formed by a top wall, a bottom wall, and side walls defining an elongated substantially cylindrical chamber, (b) inlet means in said top wall, said inlet means comprising a conduit in fluid communication with said chamber, such that the surface of said inlet means in flow communication with said silane is not directly exposed to said chamber and said inlet means is positioned and arranged so as to introduce silane into said cylindrical chamber in a non-tangential substantially axial direction, said inlet means further comprising a cooled inlet tube comprising a jacket for receiving a circulating cooling medium, said inlet means also comprising insulating septum means disposed between said cooled inlet tube and said top wall of said reactor body so as to be flush with said top wall and avoid clogging said cooled inlet tube by formation of a solid silicon plug, (c) gaseous outlet means in said side wall for removing gaseous silane decomposition products said gaseous outlet means being located remote from said top wall and spaced above said bottom wall, (d) liquid outlet means in said bottom wall, and (e) means for heating said chamber above the melting point of silicon.

12. The reactor apparatus of claim 11 wherein the heating means further comprises means for maintaining the temperature in the reactor space approximately between 1500°–1800° C.

13. The reactor apparatus of claim 12 wherein the heating means further comprises means for maintaining the temperature in the reactor space approximately between 1600°–1800° C.

14. The reactor apparatus of claim 11 wherein the reactor comprises a substantially cylindrical hollow body.

15. The reactor apparatus of claim 11 wherein the septum means comprise an annular body of carbon or graphite having one side in contact with a discharge end of the tube and another side exposed to the reactor space.

* * * * *